D. H. B. Newcomb.
Side Hill Plow.
Nº 9,801.    Patented Jan. 21, 1853.
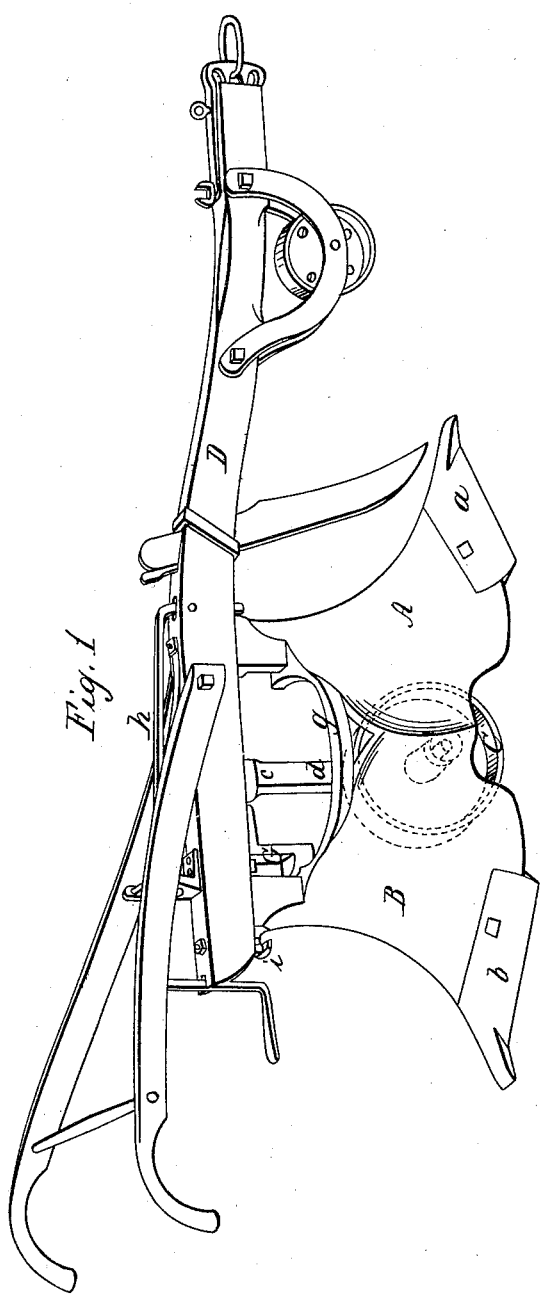
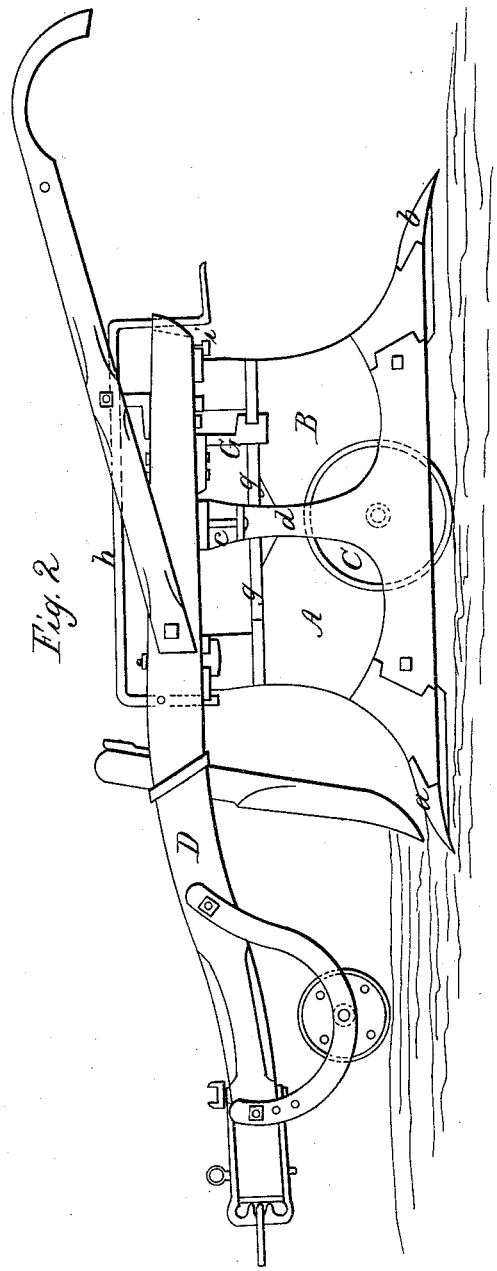

UNITED STATES PATENT OFFICE.

D. H. B. NEWCOMB, OF CONEWANGO, NEW YORK.

IMPROVEMENT IN HILLSIDE-PLOWS.

Specification forming part of Letters Patent No. 9,801, dated June 21, 1853.

*To all whom it may concern:*

Be it known that I, D. H. B. NEWCOMB, of Conewango, in the county of Cattaraugus and State of New York, have invented certain new and useful Improvements in Right and Left Hand Plows, of which the following is a full, clear, and exact description, reference being had to the accompanying drawings, which form part of this specification, and in which—

Figure 1 represents a view in perspective of a plow having my improvements applied thereto, and Fig. 2 an elevation of the landside of the same.

Plows having a double mold-board capable of running either end foremost to enable the off and near horses of the team to travel alternately in the furrow have been variously constructed; but most or all of them have been found practically defective in two most important features. One of these prominent defects has been the drag of the following share on the bottom of the furrow, which not only wears its edge off round, so that when it becomes in turn the leading share it will not cut properly, but when the plow turns laterally in its course the after share digs into the ground at the bottom of the furrow or into the land, as the case may be, and thereby not only increases the draft of the plow, but also deranges its action, so as to cause it to run deeper or shallower than the proper level, which but for this disturbing cause it would follow. Another difficulty in plows of this kind as heretofore constructed is the want of an adequate support for the swivel at the time the beam is being reversed at the end of a furrow preparatory to commencing the next.

To remedy these several defects is the object of my invention, which is embodied in the plow represented in the accompanying drawings.

At the back of the mold-boards A B, and centrally between them, a running wheel, C, is mounted on a suitable axle. The periphery of this wheel projects slightly below a straight line, joining the lower cutting-edges of the shares *a b*, in order that when on a level plane it may carry the whole weight of the plow. The journals of the axle of this wheel run in bearings formed in bosses on the inside of the mold-boards and landside. This wheel by its position and arrangement acts as a fulcrum, on which the implement will turn, so as to incline either share into the ground, so that when the advancing share is pressed down in the land it will elevate the following share off the bottom of the furrow, and thus prevent it from being worn and from digging into the ground to derange the proper action of the plow. Thus, while the plow is cutting, the wheel C not only lessens the draft of the plow, but renders less skill and labor necessary in guiding it. The central position of this fulcrum-wheel between the two mold-boards, in the same vertical transverse plane with the swivel *c*, causes it to act alike whichever mold-board is in the advance, and when reversing the mold-boards by swinging the beam D on the swivel *c*, which connects it with the sheath *d*, and in adjusting the plow to cut a parallel furrow, the fulcrum-wheel C greatly facilitates the operation by enabling the plowman by bearing down upon the handles to rock the shares up and down to free them from contact with the furrow, so that they may be easily run to the proper position to begin the next furrow. Thus the wheel C also saves time and labor in reversing and adjusting the plow.

In order to relieve the swivel *c* of injurious strain in plowing and during the reversal of the beam and handles, I have attached to the beam a bracket, G, which is provided with hooks that embrace a semicircular way or guide, *g*, formed on the top of the two mold-boards. These hooks, which embrace the guide, are of such width, distance apart, and depth that they fit loosely to the guide or track above, below, and on the inner edge, and thus effectually prevent all injurious strain upon the swivel in whatever position the beam may be, whether while plowing, when the beam and handles are held to their places by a stop, *i*, and spring-catch *h*, or when turning horizontally to change from one furrow to another.

Having thus described my improvements in plows, what I claim therein as new, and desire to secure by Letters Patent, is—

1. Arranging the two shares of a double plow, which alternately run forward on a central wheel, in such manner that the share which for the time being is in the rear shall be carried above the bottom of the furrow, substantially as described.

2. The method of relieving the swivel and of steadying and supporting the beam when set and in turning by means of a semicircular guide or track, arranged and operating in the manner and for the purposes herein set forth, in connection with a catch at each end of the track to hold the beam in place when properly adjusted.

In testimony whereof I have hereunto subscribed my name.

D. H B. NEWCOMB.

Witnesses:
P. H. WATSON,
P. HANNAY.